(12) United States Patent
Frederick (10) Patent No.: US 8,248,212 B2
(45) Date of Patent: Aug. 21, 2012

(54) PIPELINING PROCESSES IN A RF READER

(75) Inventor: Thomas J. Frederick, Chapel Hill, NC (US)

(73) Assignee: Sirit Inc., Toronto, Ontario (CA)

( * ) Notice: Subject to any disclaimer, the term of this patent is extended or adjusted under 35 U.S.C. 154(b) by 1316 days.

(21) Appl. No.: 11/753,346

(22) Filed: May 24, 2007

(65) Prior Publication Data

US 2008/0290996 A1     Nov. 27, 2008

(51) Int. Cl.
*H04Q 5/22* (2006.01)

(52) U.S. Cl. ................ 340/10.3; 340/10.1; 340/10.4; 370/252; 370/328; 370/229; 370/389

(58) Field of Classification Search ............... 340/10.3, 340/10.1, 10.4; 370/252, 328, 229, 389; 455/226.1, 115.2; 707/100, 1, 3
See application file for complete search history.

(56) References Cited

U.S. PATENT DOCUMENTS

| | | |
|---|---|---|
| 3,568,197 A | 3/1971 | Cubley |
| 3,663,932 A | 5/1972 | Mount et al. |
| 3,688,250 A | 8/1972 | Howlett |
| 3,696,429 A | 10/1972 | Tressa |
| 3,876,946 A | 4/1975 | La Clair et al. |
| 3,984,835 A | 10/1976 | Kaplan et al. |
| 4,243,955 A | 1/1981 | Daniel et al. |
| 4,297,672 A | 10/1981 | Furchey et al. |
| 4,325,057 A | 4/1982 | Bishop |
| 4,509,123 A | 4/1985 | Vereen |
| 4,595,915 A | 6/1986 | Close |
| 4,849,706 A | 7/1989 | Davis et al. |
| 4,857,925 A | 8/1989 | Brubaker |
| 4,870,391 A | 9/1989 | Cooper |
| 4,873,529 A | 10/1989 | Gibson |
| 4,903,033 A | 2/1990 | Tsao et al. |
| 4,968,967 A | 11/1990 | Stove |
| 5,012,225 A | 4/1991 | Gill |
| 5,021,780 A | 6/1991 | Fabiano et al. |
| 5,038,283 A | 8/1991 | Caveney |
| 5,095,536 A | 3/1992 | Loper |
| 5,165,109 A | 11/1992 | Han et al. |
| 5,278,563 A | 1/1994 | Spiess |
| 5,278,569 A | 1/1994 | Ohta et al. |
| 5,293,408 A | 3/1994 | Takahashi et al. |
| 5,334,822 A | 8/1994 | Sanford |
| 5,381,157 A | 1/1995 | Shiga |

(Continued)

FOREIGN PATENT DOCUMENTS

CA     2218269     4/1999

(Continued)

OTHER PUBLICATIONS

Enders A. Robinson, "A Historical Perspective of Spectrum Estimation", Proceedings of the IEEE, vol. 70, N. 9, Sep. 1982 (23 pages).

(Continued)

*Primary Examiner* — Nam V Nguyen
(74) *Attorney, Agent, or Firm* — Fish & Richardson P.C.

(57) ABSTRACT

The present disclosure includes a method and system for pipelining processes in an RF reader. In some implementations, a method includes receiving, from a transponder, a reply to an initial command. A physical (PHY) layer and a media control access (MAC) layer are pipelined to initiate transmission of a subsequent command during demodulation of the transponder reply.

21 Claims, 4 Drawing Sheets

U.S. PATENT DOCUMENTS

| | | |
|---|---|---|
| 5,396,489 A | 3/1995 | Harrison |
| 5,430,441 A | 7/1995 | Bickley et al. |
| 5,444,864 A | 8/1995 | Smith |
| 5,461,374 A | 10/1995 | Lewiner et al. |
| 5,477,215 A | 12/1995 | Mandelbaum |
| 5,495,500 A | 2/1996 | Jovanovich et al. |
| 5,506,584 A | 4/1996 | Boles |
| 5,519,729 A | 5/1996 | Jurisch et al. |
| 5,539,394 A | 7/1996 | Cato et al. |
| 5,608,379 A | 3/1997 | Narlow et al. |
| 5,613,216 A | 3/1997 | Galler |
| 5,630,072 A | 5/1997 | Dobbins |
| 5,648,767 A | 7/1997 | O'Connor et al. |
| 5,649,295 A | 7/1997 | Shober et al. |
| 5,661,485 A | 8/1997 | Manuel |
| 5,661,494 A | 8/1997 | Bondyopadhyay |
| 5,668,558 A | 9/1997 | Hong |
| 5,708,423 A | 1/1998 | Ghaffari et al. |
| 5,729,576 A | 3/1998 | Stone et al. |
| 5,745,037 A | 4/1998 | Guthrie et al. |
| 5,777,561 A | 7/1998 | Chieu et al. |
| 5,784,414 A | 7/1998 | Bruekers et al. |
| 5,825,753 A | 10/1998 | Betts et al. |
| 5,831,578 A | 11/1998 | Lefevre |
| 5,841,814 A | 11/1998 | Cupo |
| 5,850,187 A | 12/1998 | Carrender et al. |
| 5,861,848 A | 1/1999 | Iwasaki |
| 5,892,396 A | 4/1999 | Anderson et al. |
| 5,898,405 A | 4/1999 | Iwasaki |
| 5,905,405 A | 5/1999 | Ishizawa |
| 5,940,006 A | 8/1999 | MacLellan et al. |
| 5,974,301 A | 10/1999 | Palmer et al. |
| 6,025,780 A | 2/2000 | Bowers et al. |
| 6,026,378 A | 2/2000 | Onozaki |
| 6,084,530 A | 7/2000 | Pidwerbetsky et al. |
| 6,085,347 A * | 7/2000 | Du ................................ 714/751 |
| 6,094,149 A | 7/2000 | Wilson |
| 6,107,910 A | 8/2000 | Nysen |
| 6,121,929 A | 9/2000 | Olson et al. |
| 6,137,447 A | 10/2000 | Saitoh et al. |
| 6,177,861 B1 | 1/2001 | MacLellan et al. |
| 6,192,225 B1 | 2/2001 | Arpaia et al. |
| 6,219,534 B1 | 4/2001 | Torii |
| 6,229,817 B1 | 5/2001 | Fischer et al. |
| 6,229,987 B1 | 5/2001 | Greeff et al. |
| 6,232,837 B1 | 5/2001 | Yoo et al. |
| 6,275,192 B1 | 8/2001 | Kim |
| 6,317,027 B1 | 11/2001 | Watkins |
| 6,320,542 B1 | 11/2001 | Yamamoto et al. |
| 6,366,216 B1 | 4/2002 | Olesen |
| 6,412,086 B1 | 6/2002 | Friedman et al. |
| 6,414,626 B1 | 7/2002 | Greef et al. |
| 6,442,276 B1 | 8/2002 | Doljack |
| 6,456,668 B1 | 9/2002 | MacLellan et al. |
| 6,459,687 B1 | 10/2002 | Bourlas et al. |
| 6,466,130 B2 | 10/2002 | Van Horn et al. |
| 6,492,933 B1 | 12/2002 | McEwan |
| 6,501,807 B1 | 12/2002 | Chieu et al. |
| 6,531,957 B1 | 3/2003 | Nysen |
| 6,538,564 B1 | 3/2003 | Cole |
| 6,566,997 B1 | 5/2003 | Bradin |
| 6,567,648 B1 | 5/2003 | Ahn et al. |
| 6,603,391 B1 | 8/2003 | Greeff et al. |
| 6,639,509 B1 | 10/2003 | Martinez |
| 6,700,547 B2 | 3/2004 | Mejia et al. |
| 6,714,121 B1 | 3/2004 | Moore |
| 6,714,133 B2 | 3/2004 | Hum et al. |
| 6,768,441 B2 | 7/2004 | Singvall et al. |
| 6,774,685 B2 | 8/2004 | O'Toole et al. |
| 6,784,789 B2 | 8/2004 | Eroglu et al. |
| 6,794,000 B2 | 9/2004 | Adams et al. |
| 6,798,384 B2 | 9/2004 | Aikawa et al. |
| 6,816,125 B2 | 11/2004 | Kuhns et al. |
| 6,819,938 B2 | 11/2004 | Sahota |
| 6,831,603 B2 | 12/2004 | Menache |
| 6,838,989 B1 | 1/2005 | Mays et al. |
| 6,888,509 B2 | 5/2005 | Atherton |
| 6,973,296 B2 * | 12/2005 | Webster et al. ................ 455/296 |
| 6,974,928 B2 | 12/2005 | Boom |
| 7,009,496 B2 | 3/2006 | Arneson et al. |
| 7,034,689 B2 | 4/2006 | Teplitxky et al. |
| 7,039,359 B2 | 5/2006 | Martinez |
| 7,043,269 B2 | 5/2006 | Ono et al. |
| 7,053,755 B2 | 5/2006 | Atkins et al. |
| 7,058,368 B2 | 6/2006 | Nicholls et al. |
| 7,084,769 B2 | 8/2006 | Bauer et al. |
| 7,088,248 B2 | 8/2006 | Forster |
| 7,091,828 B2 | 8/2006 | Greeff et al. |
| 7,095,324 B2 | 8/2006 | Conwell et al. |
| 7,095,985 B1 | 8/2006 | Hofmann |
| 7,099,406 B2 | 8/2006 | Najarian et al. |
| 7,099,671 B2 | 8/2006 | Liang |
| 7,100,835 B2 | 9/2006 | Selker |
| 7,109,867 B2 | 9/2006 | Forster |
| 7,110,752 B2 * | 9/2006 | Okajima ....................... 455/419 |
| 7,155,172 B2 | 12/2006 | Scott |
| 7,180,402 B2 | 2/2007 | Carrender et al. |
| 7,197,279 B2 | 3/2007 | Bellantoni |
| 7,199,713 B2 | 4/2007 | Barink et al. |
| 7,215,976 B2 | 5/2007 | Brideglall |
| 7,221,900 B2 | 5/2007 | Reade et al. |
| 7,256,682 B2 | 8/2007 | Sweeney, II |
| 7,257,079 B1 | 8/2007 | Bachrach |
| 7,284,703 B2 | 10/2007 | Powell et al. |
| 7,357,299 B2 | 4/2008 | Frerking |
| 7,375,634 B2 | 5/2008 | Sprague |
| 7,385,511 B2 | 6/2008 | Muchkaev |
| 7,388,468 B2 | 6/2008 | Diorio et al. |
| 7,388,501 B2 | 6/2008 | Tang et al. |
| 7,409,194 B2 | 8/2008 | Shi et al. |
| 7,411,505 B2 | 8/2008 | Smith et al. |
| 7,413,124 B2 | 8/2008 | Frank et al. |
| 7,429,953 B2 | 9/2008 | Buris et al. |
| 7,432,817 B2 | 10/2008 | Phipps et al. |
| 7,432,874 B2 | 10/2008 | Meissner |
| 7,440,743 B2 | 10/2008 | Hara et al. |
| 7,450,919 B1 | 11/2008 | Chen et al. |
| 7,460,014 B2 | 12/2008 | Pettus |
| 7,477,887 B2 | 1/2009 | Youn |
| 7,479,874 B2 | 1/2009 | Kim et al. |
| 7,492,812 B2 | 2/2009 | Ninomiya et al. |
| 7,515,548 B2 * | 4/2009 | Chandra et al. ................ 370/252 |
| 7,526,266 B2 | 4/2009 | Al-Mahdawi |
| 7,539,259 B2 * | 5/2009 | Dias et al. ...................... 375/267 |
| 7,539,488 B2 * | 5/2009 | Friedman ...................... 455/420 |
| 7,548,153 B2 | 6/2009 | Gravelle et al. |
| 7,551,085 B2 | 6/2009 | Pempsell et al. |
| 7,557,762 B2 | 7/2009 | Shimasaki et al. |
| 7,561,866 B2 | 7/2009 | Oliver et al. |
| 7,562,083 B2 | 7/2009 | Smith et al. |
| 7,570,164 B2 | 8/2009 | Chakraborty et al. |
| 7,576,657 B2 | 8/2009 | Duron et al. |
| 7,580,378 B2 | 8/2009 | Carrender et al. |
| 7,583,179 B2 | 9/2009 | Wu et al. |
| 7,586,416 B2 | 9/2009 | Ariyoshi et al. |
| 7,592,898 B1 | 9/2009 | Ovard et al. |
| 7,592,915 B2 | 9/2009 | Liu |
| 7,594,153 B2 | 9/2009 | Kim et al. |
| 7,595,729 B2 | 9/2009 | Ku et al. |
| 7,596,189 B2 | 9/2009 | Yu et al. |
| 7,606,532 B2 | 10/2009 | Wuidart |
| 7,609,163 B2 | 10/2009 | Shafer |
| 7,612,675 B2 | 11/2009 | Miller et al. |
| 7,697,533 B2 * | 4/2010 | Tsai et al. ...................... 370/392 |
| 2001/0048715 A1 | 12/2001 | Lee et al. |
| 2002/0021208 A1 | 2/2002 | Nicholson et al. |
| 2002/0067264 A1 | 6/2002 | Soehnlen |
| 2002/0072344 A1 | 6/2002 | Souissi |
| 2002/0119748 A1 | 8/2002 | Prax et al. |
| 2002/0141347 A1 | 10/2002 | Harp et al. |
| 2003/0021367 A1 | 1/2003 | Smith |
| 2003/0052161 A1 | 3/2003 | Rakers et al. |
| 2003/0228860 A1 | 12/2003 | Jou |
| 2005/0084003 A1 | 4/2005 | Duron et al. |
| 2005/0099270 A1 | 5/2005 | Diorio et al. |
| 2005/0099340 A1 | 5/2005 | Suzuki |
| 2005/0107051 A1 | 5/2005 | Aparin et al. |

| | | | |
|---|---|---|---|
| 2005/0114326 A1 | 5/2005 | Smith et al. | |
| 2005/0116867 A1 | 6/2005 | Park et al. | |
| 2005/0156031 A1 | 7/2005 | Goel et al. | |
| 2005/0179520 A1 | 8/2005 | Ziebertz | |
| 2005/0207509 A1* | 9/2005 | Saunders et al. | 375/285 |
| 2005/0237843 A1 | 10/2005 | Hyde | |
| 2005/0259768 A1 | 11/2005 | Yang et al. | |
| 2006/0022800 A1 | 2/2006 | Krishna et al. | |
| 2006/0086809 A1 | 4/2006 | Shanks et al. | |
| 2006/0098765 A1 | 5/2006 | Thomas et al. | |
| 2006/0103533 A1 | 5/2006 | Pahlavan et al. | |
| 2006/0125603 A1 | 6/2006 | Nahear | |
| 2006/0132313 A1 | 6/2006 | Moskowitz | |
| 2006/0183454 A1 | 8/2006 | Al-Mahdawi | |
| 2006/0214773 A1 | 9/2006 | Wagner et al. | |
| 2006/0238302 A1 | 10/2006 | Loving et al. | |
| 2006/0252398 A1 | 11/2006 | Park et al. | |
| 2006/0267734 A1 | 11/2006 | Taki et al. | |
| 2006/0290502 A1 | 12/2006 | Rawlings | |
| 2007/0001809 A1 | 1/2007 | Kodukula et al. | |
| 2007/0001813 A1 | 1/2007 | Maguire et al. | |
| 2007/0018792 A1 | 1/2007 | Take et al. | |
| 2007/0046432 A1 | 3/2007 | Aiouaz et al. | |
| 2007/0060075 A1 | 3/2007 | Mikuteit | |
| 2007/0082617 A1 | 4/2007 | McCallister | |
| 2007/0127373 A1* | 6/2007 | Ho et al. | 370/229 |
| 2007/0133392 A1 | 6/2007 | Shin et al. | |
| 2007/0139200 A1 | 6/2007 | Yushkov et al. | |
| 2007/0164868 A1 | 7/2007 | Deavours et al. | |
| 2007/0188305 A1 | 8/2007 | Drucker | |
| 2007/0206704 A1 | 9/2007 | Zhou et al. | |
| 2007/0206705 A1 | 9/2007 | Stewart | |
| 2007/0222604 A1 | 9/2007 | Phipps et al. | |
| 2007/0222606 A1 | 9/2007 | Phipps et al. | |
| 2007/0236335 A1 | 10/2007 | Aiouaz et al. | |
| 2007/0285238 A1 | 12/2007 | Batra | |
| 2007/0290846 A1 | 12/2007 | Schilling et al. | |
| 2008/0012688 A1 | 1/2008 | Ha et al. | |
| 2008/0018431 A1 | 1/2008 | Turner et al. | |
| 2008/0048867 A1 | 2/2008 | Oliver et al. | |
| 2008/0049870 A1 | 2/2008 | Shoarinejad et al. | |
| 2008/0065957 A1 | 3/2008 | Shoarinejad et al. | |
| 2008/0068173 A1 | 3/2008 | Alexis et al. | |
| 2008/0084310 A1 | 4/2008 | Nikitin et al. | |
| 2008/0136595 A1 | 6/2008 | Finkenzeller | |
| 2008/0143486 A1 | 6/2008 | Downie et al. | |
| 2008/0191961 A1 | 8/2008 | Tuttle | |
| 2008/0258916 A1 | 10/2008 | Diorio et al. | |
| 2008/0278286 A1 | 11/2008 | Takaluoma et al. | |
| 2009/0022067 A1 | 1/2009 | Gotwals | |
| 2009/0053996 A1 | 2/2009 | Enguent et al. | |
| 2009/0091454 A1 | 4/2009 | Tuttle | |
| 2009/0096612 A1 | 4/2009 | Seppa et al. | |
| 2009/0101720 A1 | 4/2009 | Dewan et al. | |

FOREIGN PATENT DOCUMENTS

| | | |
|---|---|---|
| EP | 0133317 | 2/1985 |
| EP | 0498369 | 8/1992 |
| EP | 0156440 | 12/1992 |
| EP | 0915573 | 5/1999 |
| EP | 0923061 | 6/1999 |
| EP | 1095427 | 5/2001 |
| EP | 1436857 | 7/2004 |
| FR | 2648602 | 12/1990 |
| GB | 1270456 | 4/1972 |
| JP | 1158836 | 6/1989 |
| JP | 2002-185381 | 6/2002 |
| JP | 2005-227818 | 8/2005 |
| JP | 2005-253058 | 9/2005 |
| JP | 2006-252367 | 9/2006 |
| KR | 2002-0091572 | 12/2002 |
| WO | WO 90/16119 | 12/1990 |
| WO | WO 99/05659 | 2/1999 |
| WO | WO 01/24407 | 4/2001 |
| WO | WO 03/044892 | 5/2003 |
| WO | WO 04/001445 | 12/2003 |
| WO | WO 2005/072137 | 8/2005 |
| WO | WO 2006/037241 | 4/2006 |
| WO | WO 2006/068635 | 6/2006 |
| WO | WO 2007/003300 | 1/2007 |
| WO | WO 2007/094787 | 8/2007 |
| WO | WO 2007/126240 | 11/2007 |
| WO | WO 2009/058809 | 5/2009 |

OTHER PUBLICATIONS

Burgener, E.C.; "A Personal Transit Arrival Time Receiver;" IEEE—IEE Vehicle Navigation & Information Systems Conference; Ottawa, Ontario, Canada; 1993; pp. 54-55. Retrieved from <http://ieeexplore.ieee.org/xpl/freeabs_all.jsp?arnumber=585583>.

Cavoukian, Ann; "Adding an On/Off Device to Activate the RFID in Enhanced Driver's Licenses: Pioneering a Made-in-Ontario Transformative Technology that Delivers Both Privacy and Security"; Information and Privacy Commissioner of Ontario; Ontario, Canada; Mar. 2009; 3 pages. Retrieved from <http://www.ipc.on.ca/images/Resources/edl.pdf>.

Donovan, John; "Software-Defined Radio Tackles Wireless Compatibility Issues"; Portable Design; Apr. 2006; pp. 8-12. Retrieved from <http://www.qmags.com/download/default.aspx?pub=PD&upid=11675&fl=others/PD/PD_20060401_Apr_2006.pdf>.

Hansen, T. et al.; "Method for Controlling the Angular Extent of Interrogation Zones in RFID"; Seknion, Inc., 2000 Commonwealth Avenue, Suite 1008, Boston, MA 02135; 12 pages. Retrieved from <http://seknion.com/DOWNLOADS/Seknion_Paper_RFID.pdf>.

Hiltunen, Kimmo; "Using RF Repeaters to Improve WCDMA HSDPA Coverage and Capacity inside Buildings"; The 17th Annual IEEE International Symposium on Personal, Indoor, and Mobile Radio Communications (PIMRC-06); 2006; 5 pages. Retrieved from <http://www.ericsson.com/technology/research_papers/wireless_access/doc/PIMRC06_hiltunen.pdf>.

Khandelwal, G. et al.; "OPT: Optimal Protocol Tree for Efficient Tag Identification in Dense RFID Systems"; IEEE International Conference on Communications; Jun. 11-15, 2006; pp. 128-133.

"New Alien Software Can Identify Velocity, Position of Tags"; RFID News; Apr. 14, 2008; 2 pages. Retrieved from <http://www.rfidnews.org/2008/04/14/new-alien-software-can-identify-velocity-position-of-tags>.

O'Connor, Mary Catherine; "Wal-Mart Seeks UHF for Item-Level"; RFID Journal, Inc.; 2005; 2 pages. Retrieved from < http://www.rfidjournal.com/article/articleview/2228/1/1/>.

Rohatgi, A. et al.; "Implementation of an Anti-Collision Differential-Offset Spread Spectrum FRID System"; Georgia Institute of Technology, School of Electrical and Computer Engineering; IEEE Antennas Propagation Society International Symposium 2006; 4 pages. Retrieved from <http://www.propagation.gatech.edu/Archive/PG_CP_060710_AR/PG_CP_060710_AR.PDF>.

Waldrop et al.; "Colorwave: A MAC for RFID Reader Networks"; Auto-ID Center, Massachusetts Institute of Technology, Cambridge, MA; 4 pages.

Yu, P. et al.; "Securing RFID with Ultra-Wideband Modulation"; Virginia Tech Electrical and Computer Engineering Department; Blacksburg, VA; Workshop on RFID Security; Jul. 2006; 12 pages. Retrieved from <http://events.iaik.tugraz.at/RFIDSec06/Program/papers/004%20-%20Ultra%20Wideband%20Modulation.pdf>.

"Near Field UHF Versus HF"; IDTechEx; May 16, 2006; 1 page. Retrieved from <http://www.idtechex.com/research/articles/near_field_uhf_versus_hf_00000474.asp>.

Kiming, Q. et al.; "Development of a 3cm Band Reflected Power Canceller"; Research Institute of Navigation Technology; 2001 CIE International Conference on, Proceedings; 2001; pp. 1098-1102.

"Developments in Printed Conductors and Tags"; IDTechEx; Jun. 6, 2005; 1 page. Retrieved from <http://www.idtechex.com/research/articles/developments_in_printed_conductors_and_tags_00000188.asp>.

Ryu, H-K. et al.; "Size Reduction in UHF Band RFID Tag Antenna Based on Circular Loop Antenna"; 18th International Conference on Applied Electromagnetics and Communications, ICECom; Oct. 12-14, 2005; pp. 1-4.

Binu P, et al.; "A New Microstrip Patch Antenna for Mobile Communications and Bluetooth Applications"; Microwave and Optical Technology Letters; vol. 33, No. 4, May 20, 2002; pp. 285-286.

Garg et al.; "Microstrip Radiators"; Microstrip Antenna Design Handbook; Artech House, Inc. Norwood, MA; 2001; pp. 1-72.

Bridgelall, Raj; "Bluetooth/802.11 Protocol Adaptation for RFID Tags"; Symbol Technologies, Research & Development, One Symbol Plaza, Holtsville, New York 11742; 4 pages. Retrieved from http://www2.ing.unipi.it/ew2002/proceedings/001.pdf; Apr. 17, 2002.

Desmons, Dimitri; "UHF Gen 2 for Item-Level Tagging"; Impinji, Inc.; 24 pages. Retrieved from <http://www.impinj.com/files/Impinj_ILT_RFID_World.pdf>; Feb. 27-Mar. 1, 2006.

Han Y. et al.; "System Modeling and Simulation of RFID"; Auto-ID Labs at Fudan University, Shanghai, P.R. China; 12 pages. Retrieved from http://citeseerx.ist.psu.edu/viewdoc/download?doi =10.1.1.116.7275&rep=rep1&type=pdf; Sep. 2005.

Khandelwal, G. et al. "Intelligent MAC Design for RFID Networks"; The Pennsylvania State University; 1 page; published before May 24, 2007.

Kusy et al.; "Tracking Mobile Nodes Using RF Doppler Shifts"; Vanderbilt University, Nashville, Tennessee; 14 pages. Retrieved from http://www.isis.vanderbilt.edu/sites/default/files/Kusy_B_11_7_2007_Tracking_M.pdf; published before May 24, 2007.

"Radio Frequency Identification (RFID) Primer" 23 pages. Retrieved from <http://ocw.mit.edu/NR/rdonlyres/Sloan-School-of-Management/15-762JSpring-2005/23F46055-7F21-4046-B2C3-7E96680790DD/0/rfid_primer.pdf>; Spring 2005.

* cited by examiner

PIPELINING PROCESSES IN A RF READER

TECHNICAL FIELD

This invention relates to Radio Frequency IDentification (RFID) Readers and, more particularly, to pipelining processes in an RF reader.

BACKGROUND

In some cases, an RFID reader operates in a dense reader environment, i.e., an area with many readers sharing fewer channels than the number of readers. Each RFID reader works to scan its interrogation zone for transponders, reading them when they are found. Because the transponder uses radar cross section (RCS) modulation to backscatter information to the readers, the RFID communications link can be very asymmetric. The readers typically transmit around 1 watt, while only about 0.1 milliwatt or less gets reflected back from the transponder. After propagation losses from the transponder to the reader the receive signal power at the reader can be 1 nanowatt for fully passive transponders, and as low as 1 picowatt for battery assisted transponders. At the same time other nearby readers also transmit 1 watt, sometimes on the same channel or nearby channels. Although the transponder backscatter signal is, in some cases, separated from the readers' transmission on a sub-carrier, the problem of filtering out unwanted adjacent reader transmissions is very difficult.

SUMMARY

The present disclosure includes a method and system for pipelining processes in an RF reader. In some implementations, a method includes receiving, from a transponder, a reply to an initial command. A physical (PHY) layer and a media control access (MAC) layer are pipelined to initiate transmission of a subsequent command during demodulation of the transponder reply.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
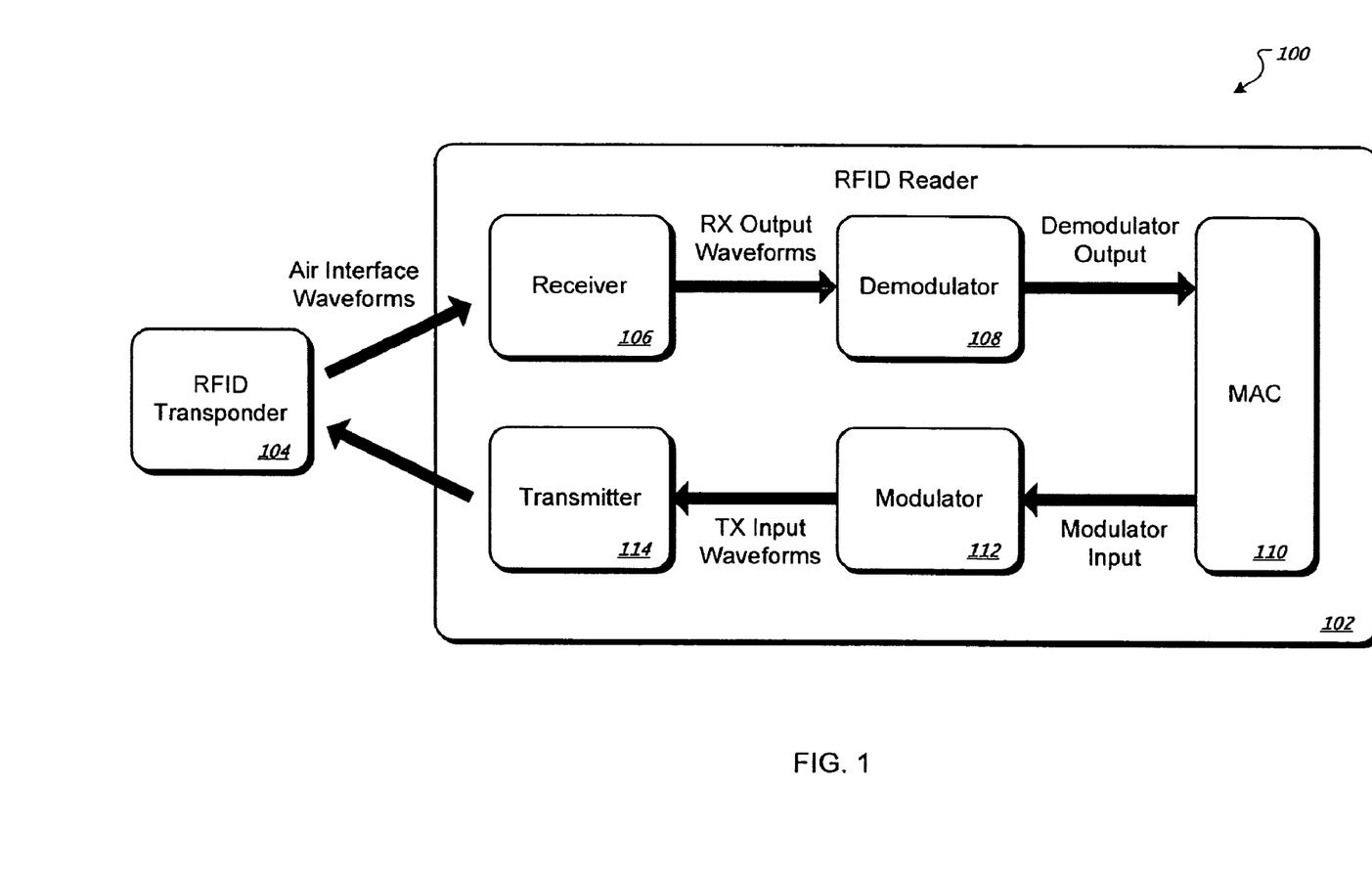
FIG. 1 is an example system for PHY-MAC pipelining in accordance with some implementations of the present disclosure.

FIG. 1 is an example system for pipelining processes in a physical layer (PHY) and media control access (MAC) layer. In this case, the system 100 includes a Radio Frequency (RF) reader 102 and a transponder 104. In some implementations, the reader 102 may transmit at least a portion of a command to a transponder prior to demodulating an entire reply from the transponder. In this example, the reader 102 can demodulate a packet received from a transponder and modulate a packet for transmission to the transponder substantially simultaneously. In some implementations, the reader 102 communicates using a half duplex, command/response format such that the reader 102 transmits commands to a transponder and then the transponder replies back to the reader 102 in response to the specific command. In some cases, the RF environment where the reader 102 and transponders operate can be noisy as other readers transmit commands in close proximity at the same or nearby frequency channels. As a result, the adjacent readers, in some implementations, can interference which the ability of the RFID reader 102 to filter out the much weaker transponder reply. By pipelining processes in the PHY layer and the MAC layer, the reader 102 can include very selective filters (e.g., receiver filters with passband from 160 KHz to 340 KHz and stopbands below 100 KHz and above 400 KHz providing 80 dB attenuation, transmit filters with 5 or more symbols of delay) without substantially increasing response times of the reader 102. In some implementations, the reader 102 may provide one or more of the following: extremely high selectivity (long delay) transmit and receive filters by pipelining command and reply processing; predicting the outcome of a transponder reply demodulation using a novel CRC look-ahead pass/fail; pass/fail demodulation prediction (e.g., collision detection) based on demodulator quality metrics; pipelining deterministic aspects of the commands, e.g., frame sync and/or preambles; use QueryAdjust following EPC for longer command to allow invalidating command (effectively becomes NAK) to avoid session flag transition on late EPC CRC failures; and others.

In some implementations, the reader 102 initiates transmission of a command in response to at least a transponder reply during demodulation of the transponder reply. In this case, the PHY layer can transmit metrics and/or status of demodulation to the MAC layer and, prior to full demodulation of a transponder reply, the MAC layer can initiate modulation of a command to the transponder. For example, the reader 102 may receive a reply packet from a transponder including a certain number of bits, and the reader 102 may initiate transmission of a command prior to demodulating the last bit of the reply. In this example, the combined delay of the reader 102 can be $20/F_L$ where $F_L$ is the transponder link subcarrier frequency (also known as the link frequency). The combined delay, in some implementations, can be approximately 62 microseconds (us).

At a high level, the reader 102 includes a receiver module 106, a demodulator 108, a MAC engine 110, a modulator 112, and a transmitter module 114. While not illustrated, the reader 100 can include other elements such as those associated with processing digital signals, noise cancellation, and/or others. The reader 102 may be a "mono-static" design, i.e., readers in which the transmitter and receiver share the same antenna or "bi-static" design, i.e., readers which use separate antennas for transmit and receive. The receiver module 106 can include any software, hardware, and/or firmware configured to receive RF signals associated with transponders. In some implementations, the receiver 106 can include filters, amplifiers, mixers, and other elements to reduce noise, filter out channels, and/or downconvert received signals.

The demodulator 108 can include any software, hardware, and/or firmware configured to demodulate an analog signal to baseband prior to digital processing. In some implementations, the demodulator 108 periodically determines the status of a reply being demodulated and passes the status to the MAC engine 110. For example, the demodulator 108 may determine one or more metrics during the demodulation of a reply from a responder. In some implementations, the demodulator 108 may determine a status (e.g., collision, successful) based, at least in part, on the metrics and pass the status to the MAC engine 110. For example, the demodulator 108 may determine an average Euclidean distance of a signal vector to a decoder, i.e., a decode distance, in the event that the decode distance, or some function of the decode distance, violates a threshold, the demodulator 108 can determine that a collision has occurred with a signal source aside from the transponder reply. The demodulator 108 may transmit this status to the MAC engine 110. In addition or in combination, the demodulator 108 may determine a receive signal strength indication (RSSI) of the transponder reply, in some implementations. In the case that the RSSI is relatively high (−40 dBm), the demodulator 108 may estimate that the decode distance must have a relatively low value for the demodulation to likely succeed. In the case that the RSSI is relatively weak (−80 dBm), the demodulator 108 may determine that the decode distance may be relatively higher due to the receiver noise floor, thus raising the dicode distance threshold for estimating that a collision has occurred and passing this status to the MAC engine 110. In some implementations, the demodulator 108 can estimate failure or success of the transponder reply based, at least in part, on cyclic redundancy check (CRC). In general, CRC can be used to determine if received data is corrupted. In this implementation, the demodulator 108 can use preliminary results of a CRC process to estimate whether the transponder reply is a failure or a success prior to processing the last bit of the transponder reply. For example, the demodulator 108 can estimate that a transponder reply is a success in the event that the CRC process has not determined an error prior to processing all bits of the transponder reply.

The MAC engine 110 can include any hardware, software, and/or firmware configured to manage protocol commands and/or responses associated with transponder inventory transmissions by the reader 100. For example, the MAC engine 110 may adjust inventory frame size based, at least in part, on parameters received from the demodulator 108. In the illustrated implementation, the MAC engine 110 initiates, prior to full demodulation of a transponder reply, transmission of a command to the transponder 104. For example, the MAC engine 110 may pass an indication to the modulator 112 to begin transmitting the deliminator and/or headers associated with the command prior to full demodulation of the transponder reply. In doing so, the MAC engine 110, the demodulator 108, and the modulator 112 operate simultaneously for at least a period of time (up to 60 microseconds, depending on the link frequency settings). In some cases, the reader 100 includes filter delays such that a short transmission (e.g., a Query Repeat command following an EPC transponder reply) can be completed prior to full demodulation of the transponder reply. Though, the MAC engine 110 can receive an indication that the transponder reply failed as a result of CRC processing or some other metric in the final bit or two of the transponder reply. If the short Query Repeat command transmission occurs prior to detecting the error, the transponder 104 can transition session states even though the reader 100 did not successfully process the transponder reply. To avoid this, in some implementations, the MAC engine 110 initiates a longer Query Adjust command prior to full demodulation of the transponder reply. In using a longer command (e.g., Query Adjust), the MAC engine 110, in some implementations, can terminate the command in the event of receiving an error from the demodulator 108 prior to complete transmission. In some implementations, a terminated (invalid) command can have the effect on the tag state machine as a NAK command and the transponder 104 can return to the inventory state without transitioning its session flag.

The modulator 112 can include any hardware, software, and/or firmware configured to modulate a signal to generate a command for transmission. As mentioned above, the modulator 112 can initiate modulation of a command for transmission to a transponder prior to full demodulation of the transponder reply. For example, the modulator 112 can start transmission of a fixed "frame sync" header or preamble before demodulation of the received packet is complete. In this example, the frame sync portion of a transmission packet is independent of the command portion and the MAC layer. Once the demodulation of the receive packet is complete, the MAC engine 110 passes the payload portion of the transmit packet to the modulator 112 before violating protocol transmission guidelines. In short, the modulator 112 passes a modulated signal to the transmission module 114. The transmission module 114 can include any software, hardware, and/or firmware configured to transmit RF signals to transponder 104. In some implementations, the transmitter 114 can include filters, amplifiers, mixers, and other elements to reduce noise, filter out channels, and/or upconvert transmit signals.

In one aspect of operation, the transponder 104 transmits a reply to the reader 102. The receiver module 106 receives the transponder reply and passes the transponder reply the demodulator 108. In connection with demodulating the reply, the demodulator 108 determines one or more metrics indicative of errors and based, at least in part, on the error metrics determines a status of the transponder reply. In addition, the demodulator 108 may use preliminary results of CRC to also determine status of the transponder reply. During demodulation, the demodulator 108 passes the status to the MAC engine 110, which initiates transmission of a command in response to the transponder reply. For example, the MAC engine 110 may initiate a frame sync. The MAC engine 110 may pipeline some portion of the command code as well. In the event that the demodulator 108 detects an error, the MAC engine 110 may change the remaining portion of the command code to alter the nature of the command and/or terminate the transmission of the command.

Figure 2:
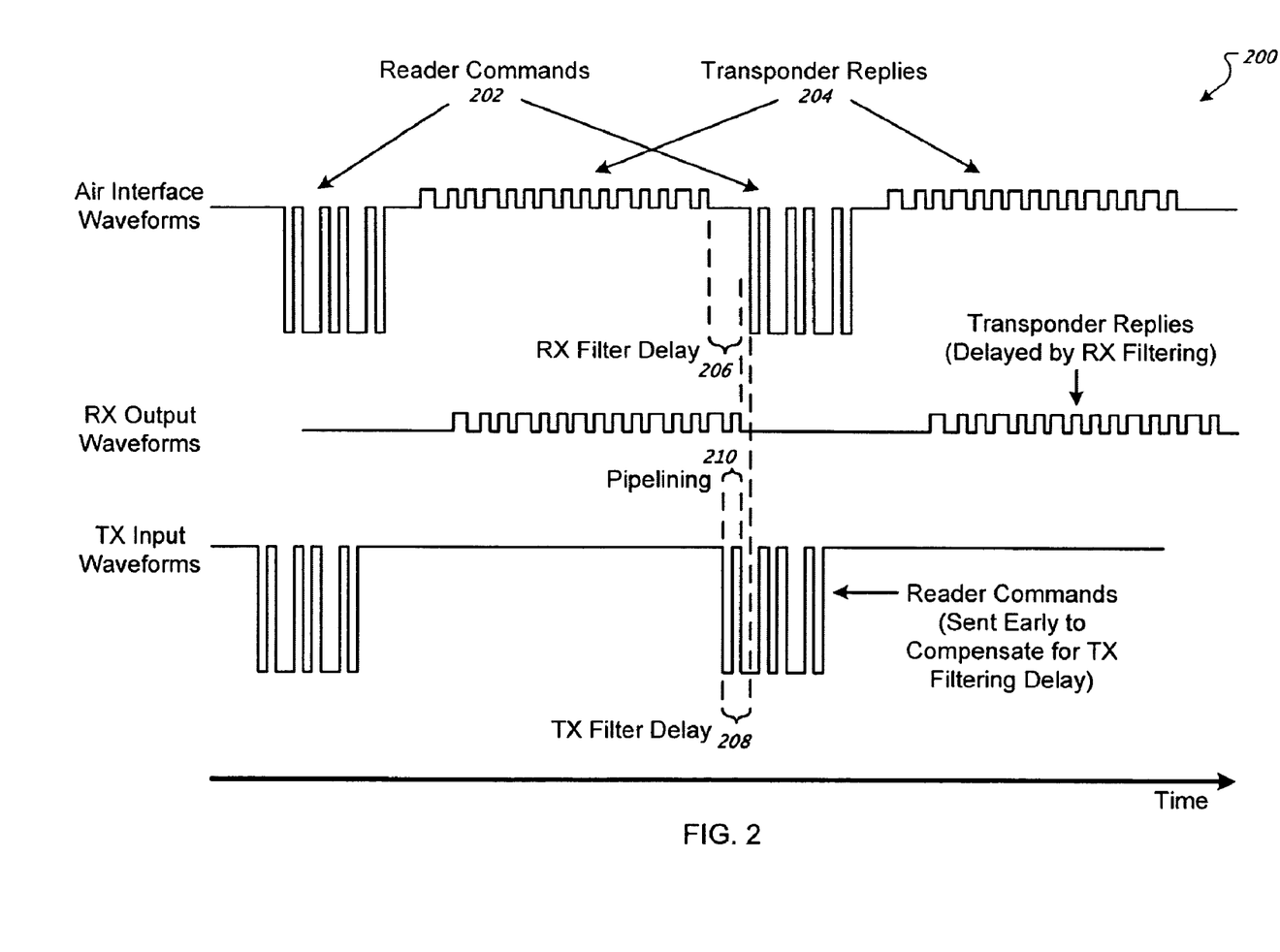
FIG. 2 is an example signal plot in the system of FIG. 1.

FIG. 2 illustrates an example signal plot 200 illustrating communications between the transponder 104 and the reader 102 of FIG. 1. In particular, the plot 200 includes reader commands 202 and transponder replies 204. In some implementations, the receiver module 106 includes highly selective filtering and, as a result, the transponder replies 204 are delayed a period of time prior to passing to the demodulator 108, as illustrated by the RX filter delay 206. Similarly, the transmission module 114, in some implementations, include highly selective filtering and, as a result, the reader commands 202 can be delayed for a period of time prior to transmission to the transponder 104, as indicated by TX filter delay 208. To at least reduce the combined filtering delays, the reader 100 pipelines some processes. In doing so, PHY processes and MAC process execute simultaneously for a period of time (up to 60 microseconds, depending on the link frequencies), as indicated by pipelining 210.

Figure 3:
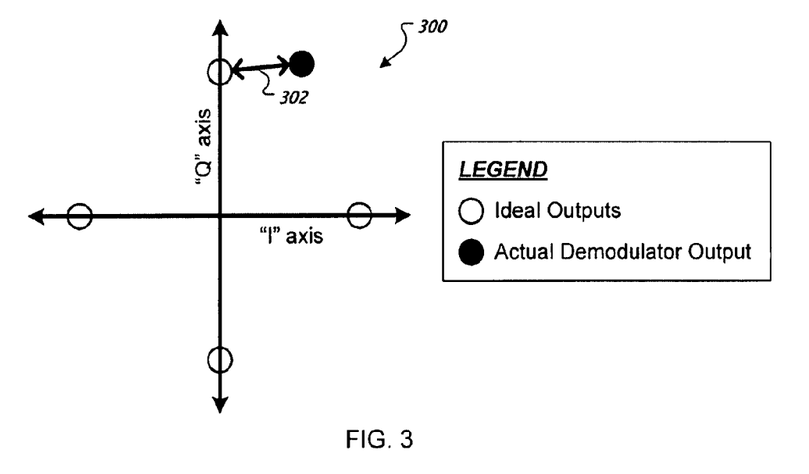
FIG. 3 is an example phase-plane plot of the transponder reply in the system of FIG. 1.

FIG. 3 illustrates an example phase-plane plot 300 of a demodulated transponder reply in the system 100 of FIG. 1. In particular, the plot 300 depicts a in-phase signal ("I") axis and a quadrature signal ("Q") axis for plotting the demodulated signal vectors of each component. Using the plot 300, a decode distance 302 can be determine and may indicate a likelihood of a collision between a transponder reply and another signal. For example, the plot 300 can illustrate a collision if the decode distance exceeds a specified threshold (6 dB signal-to-noise ratio). In some implementations, the decode distance 302 can be determined by an average Euclidean distance of the demodulated signal vector into the decoder.

Figure 4:
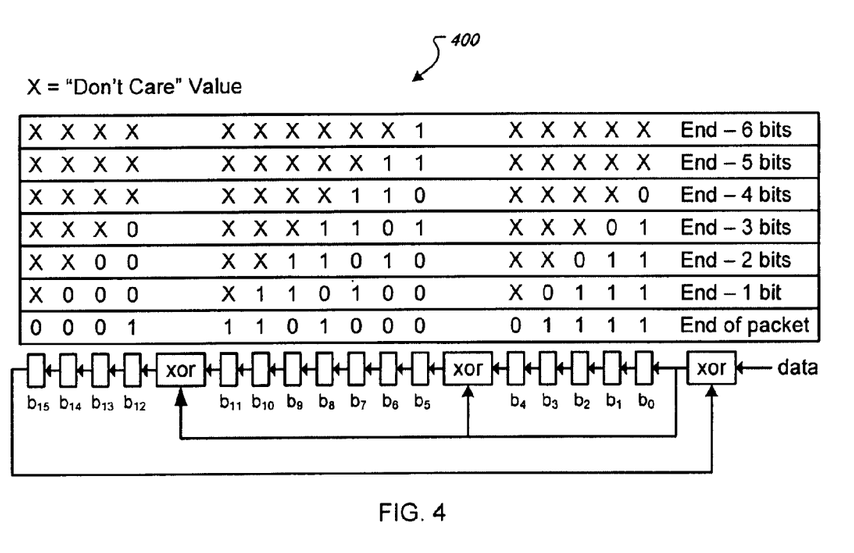
FIG. 4 is an example algorithm for executing cyclic redundancy check in the system of FIG. 1.

FIG. 4 illustrates an example CRC check algorithm 400 for determining a likelihood of an error in the transponder reply. For example, the algorithm 400 can be used to determine preliminary CRC failure results for transponder replies. In some implementations, the algorithm 400 relies on the sparse taps on an associated CRC feedback polynomial. For example, the standard CCITT 16 bit CRC polynomial is $x^{16}+x^{12}+x^{5}+1$. In this example, the gap between the $x^{12}$ feedback tap and the $x^5$ feedback tap allows some information up to 6 bits in advance of the end of the CRC process as to whether or not there is a CRC failure. In this case, the reliability increases with each additional bit until the end of the packet. The final "residue" for a valid CRC match is 0x1d0f, in hexadecimal. The table below illustrates corresponding error probabilities:

| Bits to go | CRC passing mask | Error probability |
|---|---|---|
| 6 | xxxx xxxx xx1x xxxx | ½ |
| 5 | xxxx xxxx x11x xxxx | ¼ |
| 4 | xxxx xxxx 110x xxx0 | 1/16 |
| 3 | xxx0 xxx1 101x xx01 | 1/128 |
| 2 | xx00 xx11 010x x011 | 1/1024 |
| 1 | x000 x110 100x 0111 | 1/8192 |

As indicated in the above chart, the algorithm 400 can generate a reasonable error probability with 4 or fewer bits before competition of the CRC process. In other words, assuming the BER is 1e-4 or better given that the packet has been recovered this far without a decode distance fault, there is a very high likelihood of packet demodulation success when there is no preliminary CRC fault detected with several bits to go. The algorithm 400 is generally applicable to other polynomials and may be table driven.

Figure 5:
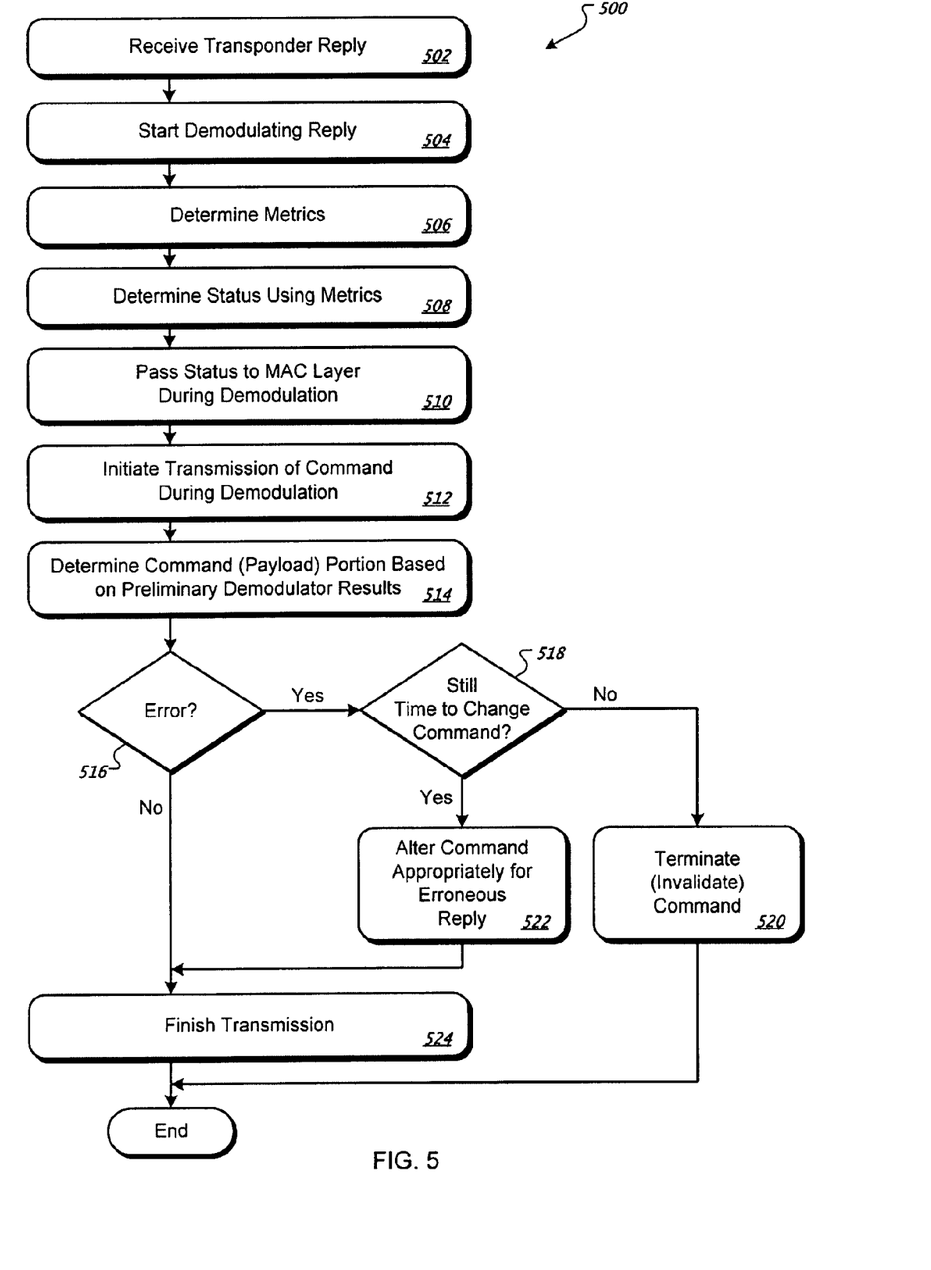
FIG. 5 is a flow chart illustrating an example method for PHY-MAC pipelining.

FIG. 5 is a flow chart illustrating an example method for PHY-MAC pipelining in the system 100 of FIG. 1. Generally, method 500 describes an example technique where the demodulator 108, the MAC engine 110, and the modulator 112 execute simultaneously for a period of time. System 100 contemplates using any appropriate combination and arrangement of logical elements implementing some or all of the described functionality.

Method 500 begins at step 502 where a transponder reply is received. For example, the transponder 104 transmits a reply to the reader 102. At step 504, demodulation of the transponder reply is initiated. In the example, the demodulator 108 starts demodulating the transponder reply. Next, at step 506, metrics for determining a likelihood of an error are determined. As for the example, the demodulator 108 determines one or more metrics such as decode distance, RSSI, CRC values, and/or others. Based, at least in part, on the metrics, a current status of the transponder reply is determined at step 508. Returning to the example, the demodulator 508 can determine at a current status (e.g., failure, success) of the demodulation process. At step 510, the current status of the transponder reply is passed to the MAC layer during demodulation. In the example, the demodulator 508 may continuously or periodically pass, to the MAC engine 110, the status of the transponder reply during the demodulation process. Next, at step 512, transmission of a command in response to the transponder reply is initiated. In the example, the MAC engine 110 can initiate transmission of a command which may include initiating a sync frame, which can be independent of the payload. At step 514, a command portion of the transmission packet is determined based on preliminary demodulator results. If an error is detected during the demodulation of the transponder reply at decisional step 516, then execution proceeds to decisional step 518. If the MAC layer does not have sufficient time to alter the command, then, at step 520, the command is terminated. If the MAC layer has sufficient time to alter the command at decisional step 518, the MAC layer alters the command in accordance with the erroneous reply at step 522. Returning to decisional step 516, if an error is not detected, then, at step 524, the transmission is completed. In some implementations, the reader 102 transmits a Query Adjust to increase the length of the command and ensure that the MAC engine 110 can terminate the command in response to detecting an error in the last few bits.

A number of embodiments of the invention have been described. Nevertheless, it will be understood that various modifications may be made without departing from the spirit and scope of the invention. Accordingly, other embodiments are within the scope of the following claims.

What is claimed is:

1. A Radio Frequency (RF) device for pipelining process, comprising:
   a receiver module configured to receive a reply from a transponder in response to an initial command;
   a demodulator configured to demodulate the transponder reply and determine preliminary metrics indicative of errors in the transponder reply during demodulation;
   a Media Access Control (MAC) engine configured to determine, based on the preliminary metrics, content of and initiate transmission of a subsequent command to the transponder prior to completing demodulation of the reply and, in response to completing demodulation of the reply, either updating the subsequent command signal or terminating transmission of the subsequent command;
   a modulator configured to modulate a signal with commands; and
   a transmitter module configured to transmit signals to the transponder.

2. The RF device of claim 1, wherein the demodulator is further configured to determine a current status of the transponder reply and pass the current status to the MAC engine.

3. The RF device of claim 2, wherein the current status is based on at least one of a decode distance or a receive signal strength indication (RSSI).

4. The RF device of claim 2, wherein the current status is based on a current status of a cyclic redundancy check (CRC) process prior to completion of demodulation.

5. The RF device of claim 1, wherein the demodulator continuously determines a status of the transponder reply and continuously passes the status to the MAC engine.

6. The RF device of claim 1, wherein the subsequent command after an Electronic Product Code (EPC) transponder reply comprises a Query Adjust.

7. The RF device of claim 1, wherein the MAC engine configured to initiate transmission of the subsequent command comprises the MAC engine configured to initiate transmission of a frame sync during demodulation of the transponder reply.

8. The RF device of claim 1, wherein the MAC engine is further configured to terminate transmission of the subsequent command in response to at least receiving an indication of an error from the demodulator.

9. The RF device of claim 1, wherein the demodulator, the MAC engine, and the modulator operate simultaneously for a period of time during demodulation of the transponder reply and modulation of the subsequent command.

10. The RF device of claim 1, wherein a period of time from a final bit of the transponder reply enters the receiver module to a time a deliminator symbol of the subsequent command exits the transmitter module is less than $20/F_L$ where $F_L$ is a transponder link subcarrier frequency.

11. A method for managing transmissions, comprising:
    receiving, from a transponder, a transponder reply to an initial command;
    pipelining a physical (PHY) layer and a media control access (MAC) layer to initiate transmission of a subsequent command during demodulation of the transponder reply; and
    in response to completing demodulation of the transponder reply, either updating the subsequent command or terminating transmission of the subsequent command.

12. The method of claim 11, wherein pipelining the physical layer and the media control access layer comprises:
    determining metrics indicative of errors in the transponder reply during demodulation;
    initiating transmission of the subsequent command to the transponder prior to completing demodulation; and
    modulating a signal with at least a portion of the subsequent commands prior to completing demodulation.

13. The method of claim 12, further comprising:
    determining a current status of the transponder reply based, at least in part, on the determining metrics; and
    passing the current status to the MAC layer.

14. The method of claim 13, wherein the current status is based on at least one of a decode distance or a receive signal strength indication (RSSI).

15. The method of claim 13, wherein the current status is based on a current status of a cyclic redundancy check (CRC) process prior to completion of demodulation.

16. The method of claim 13, wherein a current status the transponder reply is continuously determined and continuously passed to the MAC layer.

17. The method of claim 11, wherein the subsequent command after an Electronic Product Code (EPC) transponder reply comprises a Query Adjust.

18. The method of claim 12, initiating transmission of the subsequent command comprises initiating transmission of a frame sync during demodulation of the transponder reply.

19. The method of claim 12, further comprising terminating transmission of the subsequent command in response to at least receiving an indication of an error during demodulation.

20. The method of claim 12, wherein demodulation, the MAC layer, and the modulation operate simultaneously for a period of time during demodulation of the transponder reply.

21. The method of claim 12, wherein a period of time from a final bit of the transponder reply is received to a time a deliminator symbol of the subsequent command is transmitted is less than $20/F_L$ where $F_L$ is a transponder link subcarrier frequency.

\* \* \* \* \*

UNITED STATES PATENT AND TRADEMARK OFFICE
CERTIFICATE OF CORRECTION

| | |
|---|---|
| PATENT NO. | : 8,248,212 B2 |
| APPLICATION NO. | : 11/753346 |
| DATED | : August 21, 2012 |
| INVENTOR(S) | : Thomas J. Frederick |

It is certified that error appears in the above-identified patent and that said Letters Patent is hereby corrected as shown below:

<u>Column 8</u>

Line 1, in Claim 16, delete "status the" and insert -- status of the --, therefor.

Signed and Sealed this
Twelfth Day of March, 2013

Teresa Stanek Rea
*Acting Director of the United States Patent and Trademark Office*